United States Patent [19]

Jürgensen

[11] 4,244,005

[45] Jan. 6, 1981

[54] METHOD AND APPARATUS FOR AVOIDING OR MINIMIZING UNWANTED LINE-STRUCTURES IN THE ELECTRONIC REPRODUCTION OF IMAGES

[75] Inventor: Heinrich Jürgensen, Raisdorf, Fed. Rep. of Germany

[73] Assignee: Dr.-Ing. Rudolf Hell GmbH, Raisdorf, Fed. Rep. of Germany

[21] Appl. No.: 971,211

[22] Filed: Dec. 20, 1978

[30] Foreign Application Priority Data

Dec. 27, 1977 [DE] Fed. Rep. of Germany ....... 2758305

[51] Int. Cl.³ .............................................. H04N 3/00
[52] U.S. Cl. .................................... 358/201; 358/235
[58] Field of Search ............... 358/199, 201, 230, 235, 358/285, 292, 293, 294

[56] References Cited

U.S. PATENT DOCUMENTS 3,055,258  9/1962  Hurvitz ........................... 358/201 X
3,997,722  12/1976  Bardos ................................. 178/7.6

FOREIGN PATENT DOCUMENTS 1468742  3/1977  United Kingdom .

Primary Examiner—Robert L. Richardson
Attorney, Agent, or Firm—Brisebois & Kruger

[57] ABSTRACT

A method of avoiding unwanted line structures in the electronic reproduction of images by means of a monochromatic light source in whose beam path an acousto-optic modulator (AOM) cell is arranged. One line consists of a multiple line made up of a plurality of sub-lines. The acousto-optic modulator (AOM) cell is driven by a mixture of ultrasonic waves of discrete frequencies, by which means the beam is split up into a plurality of sub-beams each associated with a discrete frequency which together determines the line width. The individual frequencies are so calculated that the sub-beams overlap and so that the amplitudes of the frequencies produce a uniform intensity distribution in a line.

9 Claims, 8 Drawing Figures

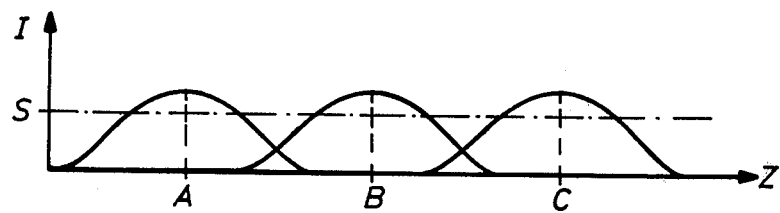
Fig. 1
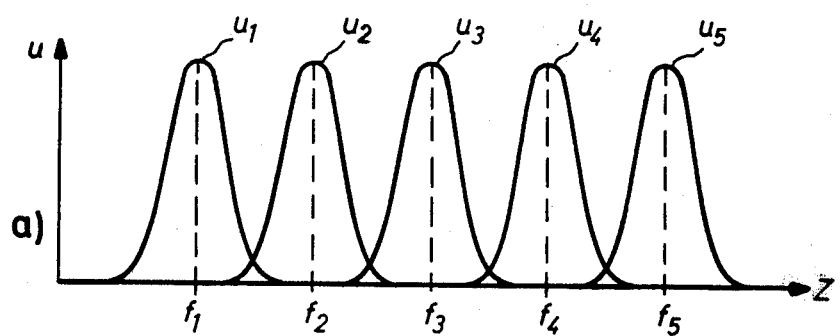
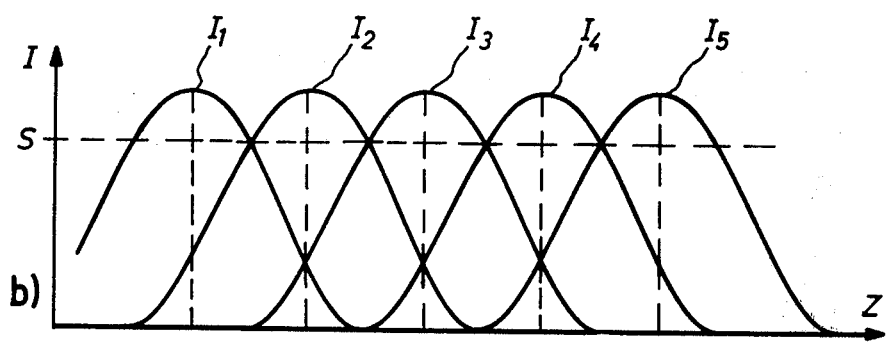
Fig. 2

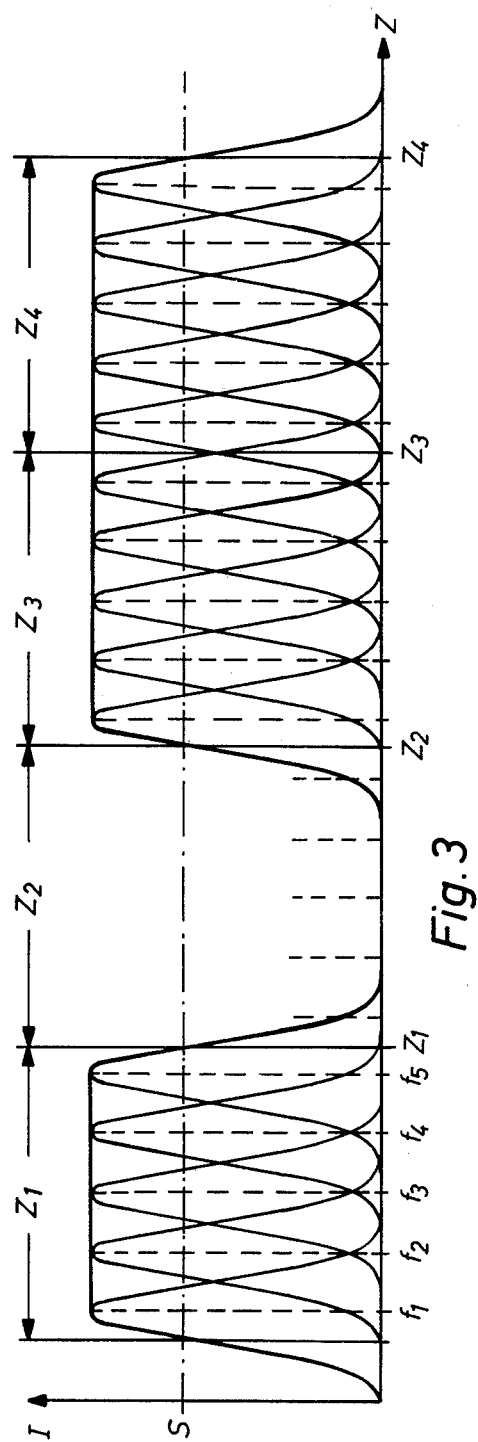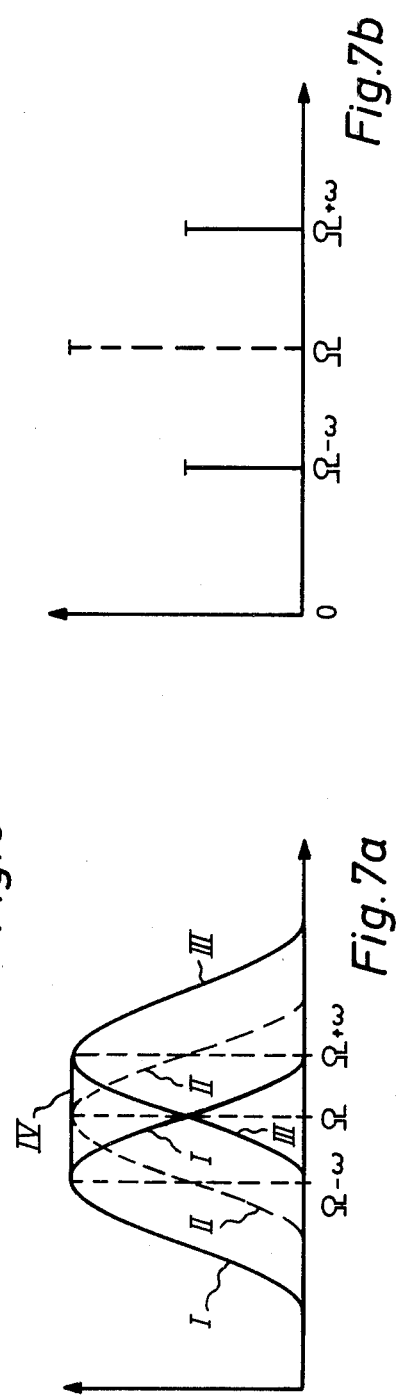

METHOD AND APPARATUS FOR AVOIDING OR MINIMIZING UNWANTED LINE-STRUCTURES IN THE ELECTRONIC REPRODUCTION OF IMAGES

BACKGROUND OF THE INVENTION

The present invention relates to methods of and apparatus for avoiding or minimising unwanted visible line structures in the electronic reproduction of images, by means of a monochromatic light source whose intensity is controlled by an image signal and in whose beam path is arranged an acousto-optic modulator (AOM) cell which is arranged to carry out the reproduction of the image line by line on a reproducing surface, one line in the reproduction consisting of a multiple line constituted by a plurality of sub-lines. Hereinafter such a method and apparatus will be referred to as "of the kind described".

In the case of image reproduction such as in television and in the transmission of press photographs, weather charts, written documents and the like by land-line or radio, the image is scanned and reproduced again line by line. When reproducing the image, use is made of an energy beam which is deflected in lines and which is modulated in accordance with an image signal obtained by scanning the image. This method of reproduction has long been familiar, for example in television engineering or from German Offenlegungschrift No. 22 10 310, but it has the disadvantage that the line structure resulting from the gaussian energy distribution in the energy beam employed and from the spacing between the individual lines becomes visible. These two factors mean that a choice has to be made between two evils.

On the one hand adjoining lines can be spaced further apart than the mean beam width, in which case it is true that the image is of optimum sharpness because of the good physical separation between the image information, but the line brightness, fluctuating as it does in sequence with the lines, becomes disturbingly apparent and is therefore an unwanted line structure. If on the other hand the spacing between the lines is smaller than the mean beam width and the fluctuations in line brightness are eliminated by the resultant overlap, then there is a loss of sharpness. These problems are familiar and are discussed for example on page 590 of the "Elektrotechnische Zeitschift" volume 13, number 22 for Oct. 30, 1961 and in U.S. patent specification No. 3,997,722. To avoid these faults, either the trace spot is unsharpened to a greater or lesser degree to widen it, as a result of which the image becomes less sharp, or else the trace beam is wobbled at high speed transversely to the direction of reproduction. This is admittedly better in that sharpness is preserved but at the junction between one line and the next there is still a residual brightness fault if the amplitude of the wobble is not exactly matched to the line spacing. Slight alterations in the frequency of wobble or mechanical changes in operation mean that the intensity distribution in the direction of wobble alters, in which case the beam is of greater intensity in one direction of deflection than in the other, which once again produces a line structure.

Another possible way of suppressing the unwanted line structure in an image has also been disclosed in GB patent specification No. 1,468,742. When a light beam is used for reproduction, the beam is broken down into a plurality of sub-beams by means of a plurality of apertures situated next to one another in a mask and the sub-beams are then traced out by means of an optical system as a plurality of individual parallel lines, which does away with the gaps between the lines. This method has the disadvantage that light losses occur due to the intervals between the apertures and due to the peripheral areas. Further light losses are caused by the fact that if the sub-beams are all to be of the same intensity, the mask can only be arranged in the central region of the beam profile, where intensity is approximately uniform. Also, such masks are expensive to manufacture and difficulties may occur as a result of dirtying of the masks.

It is an object of the invention to provide a better and more reliable solution to this problem and to establish a method and apparatus by means of which the unwanted line structure can be completely suppressed or minimised without any loss of sharpness occurring. A further problem which exists with image reproduction of this kind is that of adjusting the line width. This may be required if it is desired to scan and reproduce with different resolutions or if a change of scale is to be made between the original and the reproduction. In the case of the GB patent specification No. 1,468,742 mentioned above, the line width can for example be varied only by the width of one mask segment, which means that the line width can only be varied in relatively coarse steps, unless the mask or the objective lens were to be changed for each resolution, i.e. line width, which would not however overcome the disadvantages of the mask arrangement. It is therefore a further object of the invention to make it possible for the line width to be continuously varied without a line-structure arising.

SUMMARY OF THE INVENTION

Accordingly the invention consists in a method of the kind described wherein the acousto-optic modulator (AOM) cell is driven by a mixture of ultrasonic waves of discrete frequencies, by which means the beam is split up into a plurality of sub-beams, each associated with a discrete frequency, plurality of sub-beams, each associated with a discrete which together determine the scanned line width, and wherein the individual frequencies are so calculated that the sub-beams overlap, and the amplitude of the frequencies is such as to produce a uniform intensity distribution within a line.

The acousto-optic (AOM) cell may be controlled in respect of intensity by the image signal from the scanning or by stored picture signals or by a character generator.

Advantageously, the monochromatic light source is a modulatable laser.

The invention also consists in apparatus for carrying out the method, comprising a laser beam generator, an acousto-optic modulator (AOM) cell arranged in the laser beam which as produced by said generator, said cell bbeing connected to a high-frequency control circuit, said control circuit comprising a plurality of high-frequency oscillators set to different frequencies whose outputs are combined by a summing circuit and which are connected to said acousto-optic modulator (AOM) cell via a power amplifier.

BRIEF DESCRIPTION OF THE DRAWINGS

In order that the invention may be more clearly understood, reference will now be made to the accompanying drawings which show an arrangement according to the prior art and some embodiments of the invention for comparison therewith, by way of example, and in which:

FIG. 1 shows the intensity distribution of a trace beam over a plurality of lines of an image, in a case where the line structure becomes visible as in the prior art, FIG. 2 shows the intensity distribution in a line according to the invention, FIG. 3 shows the intensity distribution over a plurality of lines, FIG. 7a shows the intensity pattern in a trace line using the embodiment of FIG. 6, and FIG. 7b shows the frequency spectrum for the embodiment of FIG. 6.

DETAILED DESCRIPTION OF PREFERRED EMBODIMENTS

Figure 4:
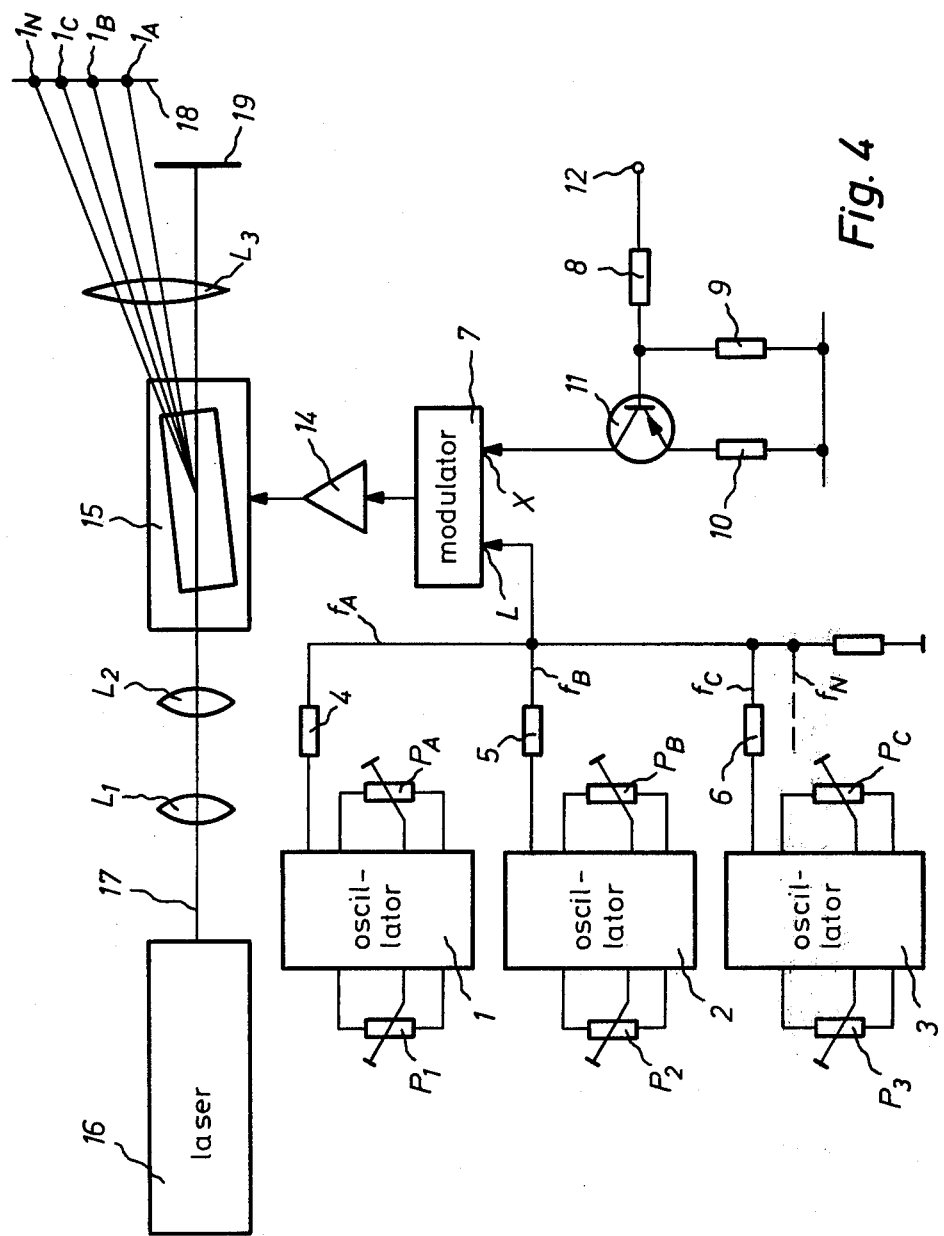
FIG. 4 shows an embodiment of apparatus according to the invention.

Referring now to the drawings, FIG. 1 shows the pattern of intensity in the trace beam in conventional reproduction where there is a line structure, using as an example three lines A, B, and C whose centres are indicated by broken lines and coincide with the maximum level of energy in the individual beams, the distribution of the energy following a Gauss function. The direction Z perpendicular to the direction of line reproduction is used as the x-axis. Although the beams themselves overlap, the intensity at the points of overlap is below the exposure threshold S of the reproduction material.

FIG. 2 shows the intensity distribution in a line when the light beam is split up into five different sub-beams, which is achieved by applying the voltages $u_1$, $u_2$, $u_3$, $u_4$ and $u_5$, of frequencies $f_1$ to $f_5$, which are shown in the upper part (a). In part (b) of FIG. 2, which shows the intensities $I_1$, $I_2$, $I_3$, $I_4$ and $I_5$ of the sub-beams, it can be seen that the combined waveform is always above the exposure threshold S and that no secondary line structures occur within the lines. The slope at the edges of the line produced by the splitting up process is also much steeper than in the case of the simple Gauss distribution which occurs when the lines are traced out by only a single beam as in FIG. 1.

FIG. 3 shows an example of intensity distribution in a case where a plurality of lines are contiguous to one another. It is assumed that the first line $z_1$ is black, the second line $z_2$ white, and the third and fourth lines $z_3$ and $z_4$ black again. It can be seen that no line structure occurs at the transition between lines $z_3$ and $z_4$ since the intensity is always above the threshold S.

FIG. 4 shows an embodiment of the invention for making a division into three or more sub-beams. There are for example three oscillators, 1, 2, 3 provided which generate three different frequencies $f_A$, $f_B$ and $f_C$. To allow the line width to be selected, these frequencies are adjustable at potentiometers $P_A$, $P_B$ and $P_C$ and are assumed to be set to the values 35, 40 and 45 MHz for example. As will be apparent from the previous Figures, the number of the oscillators and the spacing of their frequencies determine the line width. It is however also possible to use fixed-frequency oscillators e.g. quartz oscillators, if there is no need to alter the line width.

Via a resistor network consisting of resistors 5, 4, and 6 the output voltages from oscillators 1, 2, 3 are added and are fed to an input L of an amplitude modulator 7. Various active or passive circuits may be used for the modulator. In the present case it will be assumed that a commercially available Type 1054 A Double Side Band Mixer made by Messrs. Hewlett and Packard is used.

The modulator 7 is controlled via a matching network consisting of resistors 8, 9 and 10 and a transistor 11, a signal source 12 which supplies the image signal being connected to the modulator 7 via the transistor in such a way that the modulator 7 is current-controlled at its input X. It is however also possible for the modulator to be controlled directly by a matched input voltage. It is assumed that the maximum video frequency in the present case is 500 kHz. The signal arising at the output of the modulator 7 is fed to a high-frequency power amplifier 14 such as the type RFA 1106 which can be obtained from the Isomet company. The output from this amplifier is fed to an acousto-optic modulator (AOM) cell 15. Alternatively, it would be possible to connect the modulator 7 between the output of the amplifier 14 and the AOM cell. The AOM cell 15, whose operation will be described in detail at a later stage with reference to FIG. 5, diffracts a monochromatic light beam 17 coming from a laser 16 and splits it into a plurality of sub-beams, an optical matching system being provided between the laser 16 and the acousto-optical modulator as is indicated schematically by the lenses L1 and L2. The split up sub-beams produced by the modulator are directed onto a reproduction medium 18 via a further optical system, consisting of a lens L3 which is also indicated schematically. The undiffracted sub-beam is masked off by a mask 19. In the present case the AOM cell 15 requires a driving power of approximately 2 watts for example.

Since the efficiency of the AOM cell is dependent on frequency and is best at the centre frequency (40 MHz), assuming equal levels of driving power the two outside beams will be of slightly lower intensity. To overcome this, setting potentiometers P1, P2 and P3 are provided for the oscillators 1, 2 and 3 by means of which the driving power from each oscillator can be adjusted so that the intensity, i.e. the brightness distribution within the line, is uniform.

The laser 16 used may for example be a type 162 or 120 made by the Spectra company. It is also possible for different wave-lengths to be used, e.g. blue, red or green.

By means of the optical matching system L1 and L2, the diameter of the laser beam is matched to the AOM cell 15 so that a line junction occurs precisely at the preset frequencies. Thus, for an ultra-sonic transit time of 0.5 $\mu$s a diameter of approximately 1.5 to 2 mm is required. The matching lenses L1 and L2, which have focal lengths f1 and f2, allow laser beams of any desired diameter to be matched. The following is the equation which applies: $(d_1/d_2) = (f_1/f_2)$ in which
$d_1$ = entry diameter of beam
$d_2$ = exit diameter of beam
$f_1$ = focal length at entry
$f_2$ = focal length at exit.

With three simultaneously applied frequencies, the laser beams emerging from the AOM cell 15 lie in four different directions:

(1) Direction 0: the undiffracted light which is not intended to reach the photographic material,
(2) Direction $1_A$: the light diffracted by frequency $f_A$,
(3) Direction $1_B$: the light diffracted by frequency $f_B$,
(4) Direction $1_C$: the light diffracted by frequency $f_C$.

Directions $1_A$, $1_B$ and $1_C$ represent first order diffractions and are made use of by arranging a lens L3 and a mask 19 between the AOM cell 15 and the photographic material 18, as already mentioned. The beams in directions $1_A$, $1_B$ and $1_C$ are focussed, i.e. are directed onto the photographic material 18, and produce aligned trace spots $1_A$, $1_B$, and $1_C$.

It is also possible to arrange a telescope between the AOM cell 15 and the objective lens L3 in order to modify the beam diameter again, i.e. to match it to an objective of given focal length. In this case the defining mask will advantageously be arranged on a level with the focus of the telescope. In practice the diameter of the individual trace spots can be calculated from the focal length of the objective and the entry diameter of the beam. The relation $d_s \approx K \cdot f_3/d_2$, in which K is a correcting factor and f3 is the focal length of the objective in millimeters, is often adequate to give a rough estimate.

The width of three lines may preferably be approximately 36 μm, which represents a fineness of reproduction of approximately 300 lines per centimeter. Since the angle of diffraction, and thus the line width, alters at different laser wave-lengths, it is advantageous for the objective to be in the form of a zoom lens so that an adjustment can always be made to the same line width when a series of colour exposures are to be made one after the other.

If for example three lasers are used and the three laser beams are combined by means of a set of partly transparent mirrors before the objective is reached, the diameters of the individual beams and the control frequencies will be adjusted beforehand so that the lines are of equal width.

It is also possible to calculate the spacing between the sub-beams in the plane of the image from the angles of diffraction associated with the individual frequencies. Here the AOM cell 15 is of the type 304 made by Coherent Ass. of USA, the angular change is 0.188 mrad per MHz at a wavelength of 632.8 nm. The spacing in the plane of the image is obtained by multiplying the angle by the focal length of the objective lens L3. In the above example, with $\Delta F=5$ MHz and $f_3=30$ mm:

a = 0.188 mm·5·0.03 m = 0.028 m = 28 μm.

If a resolution of 40 lines per centimeter for example is adopted for apparatus used in facsimile transmission, the beam diameter must be reduced accordingly upstream of lens L3 or the focal length of lens L3 must be increased.

Figure 5:
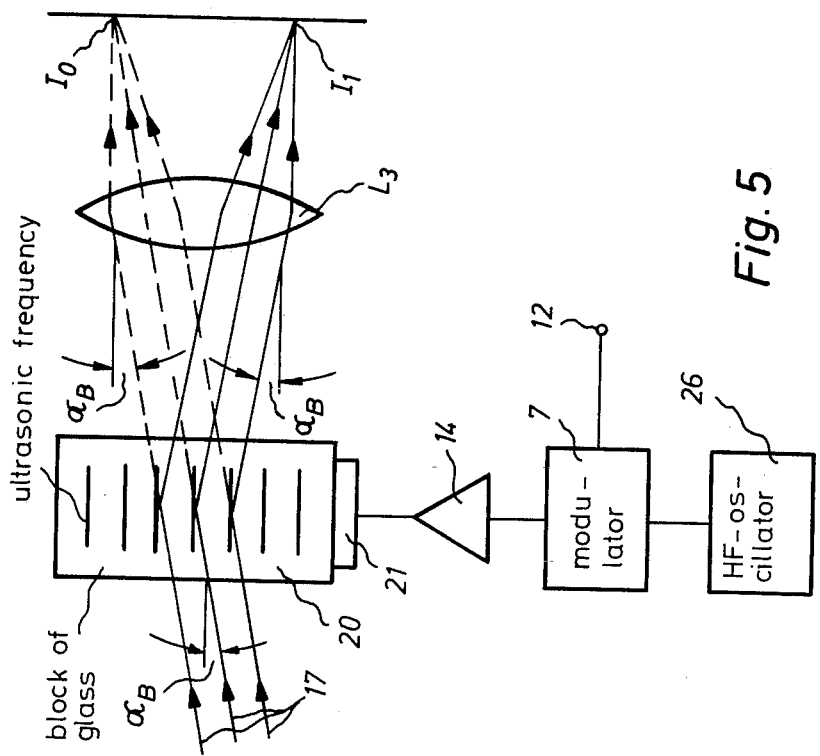
FIG. 5 shows the general construction of an acousto-optic modulator (AOM) cell.

FIG. 5 shows the general construction of the AOM cell 15 used and its principle of operation. An ultrasonic wave is coupled into a block 20 of a suitable optical material e.g. glass, via a piezo-oscillator 21. The ultrasonic frequency acts on the laser beam 17 passing through the material by diffracting a portion of its light. If the block of material 20 is of suitable dimensions and if the light is incident on it at a certain angle known as the Bragg angle, approximately 80% or more of the light is diffracted. If two or more frequencies e.g. 35, 40 and 45 MHz, are applied to such an AOM cell, each frequency diffracts a part of the light in a different direction. If the laser beam is then focussed by means of the lens L3, then, as already mentioned, a plurality of aligned spots can be produced whose spacings correspond to the spacings between the frequencies. In the present case only the beam $I_0$ which passes straight through and one diffracted beam $I_1$ are shown. The actuation by a power amplifier 14 and a modulator 7, which is acted on by the image signal and a high-frequency oscillator, corresponds in essence to the actuation shown in FIG. 4 and the following Figure.

The number of resolvable spots depends on the diameter of the laser beam in the AOM cell and the frequency range over which the modulator operates and on the speed of sound in the material.

Also dependent on the diameter of the laser beam in the acousto-optical modulator is the switching time τ, since one cycle of switching on and off cannot take place quicker than is permitted by the transit time of the ultrasonic wave across the beam diameter. The following equation is found for the resolution which can be achieved.

$N = \tau \cdot \Delta f + 1$ where N = the number of resolvable spots $\Delta f$ = frequency range $\tau$ = switching time.

If a switching time of 0.5 μs is selected, then with $\Delta f = 10$ MHz, six spots can be resolved. Thus, if the beam diameter and frequency range are correctly selected, the individual sub-beam tracks can be made to run into one another, by which means an unwanted line structure is completely avoided without losing sharpness.

Another advantageous application of the invention is to the reproduction of coloured pictures. Since colour film has to be exposed with extreme uniformity to give an even reproduction of colour, the Gaussian distribution of intensity in an individual trace beam is disadvantageous because it means that the colour layers are not uniformly exposed. A colour cast thus arises. Because of the Gaussian pattern of the beam, the colour layer is more exposed in the centre of the lines, that is to say where the intensity is greatest. When the present invention is used this is avoided since, as can be seen in FIGS. 2 and 3, the slope of the edges of a split up trace spot is much greater than it is with simple Gaussian distribution pattern and an intensity of uniform amplitude within the line is obtained.

Figure 6:
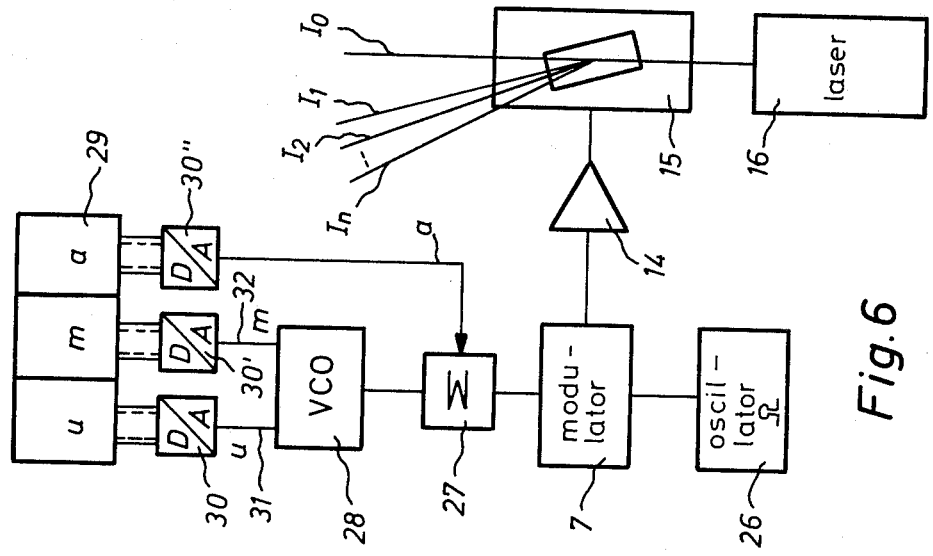
FIG. 6 shows a further embodiment of the invention.

FIG. 6 shows a further embodiment of the invention, again present are a laser 16 and an AOM cell 15 which is driven by an HF power amplifier 14. The power amplifier 14 is driven by a mixed frequency which conforms to the function $Y = \sin \Omega t [a + m \cdot \sin (\omega t)]$ This voltage is obtained from a modulator 7 to which a carrier frequency $\Omega$ and the function $a + m \cdot \sin (\omega t)$ are applied. The magnitude $a + m \cdot \sin (\omega t)$ is obtained by means of an adder 27 by combining a constant a which represents brightness with a voltage $m \cdot \sin (\omega t)$. The carrier frequency is generated by a generator 26. The voltage $m \cdot \sin (\omega t)$ is produced by a voltage-controlled oscillator 28 from the values u and m which are fed out from a store 29 via digital/analogue convertors 30 and 30' and lines 31 and 32. The value a is fed out from the store 29 via a digital/analogue convertor 30". The significance of these values and there interrelation will be explained in more detail in what follows with reference to FIGS. 7a and 7b.

FIG. 7a shows the intensity curve from numbers I and III of three sub-beams which in sum produce an intensity curve IV when there is no curve II. The individual sub-beams are produced by the frequencies $\Omega + \omega$ and $\Omega - \omega$ whose spectra are shown in FIG. 7b. These frequencies are obtained from the modulator 7 in FIG. 6. The spacing of curves I and III is determined by the values of these frequencies and their heights by the modulation factor m and the amplitude constant a. In the example shown in FIG. 7a the sub-beam derived from the carrier frequency $\Omega$ has been suppressed.

The arrangement shown in FIG. 6 is particularly suitable for a reproducing unit which is intended to operate with different line widths. With this arrangement there is the possibility of feeding into the store 29 various parameters for a and m and for the value u by which the frequency $\omega$ is determined and then, if a change in line width is required, the appropriate parameters for a, m and u can be called up from the store and can be converted by means of the voltage-controlled oscillator 28, the adder 27 and the modulator 25 into corresponding control signals for the AOM cell 15.

The invention is not restricted by the kind of electrical modulation of brightness by the image signal which has been described with reference to the embodiments shown in FIGS. 4 and 6 and it is also possible to use a modulatable laser or a further modulator situated in the beam path. The image signal for the brightness modulation can for example be derived directly from an opto-electrical scanner or from stored picture data or a character generator.

The invention can also be used with advantage for the reproduction screened images to avoid the unwanted line structure which occurs between line segments with screen dots which are built up from line segments which differ in number and length.

I claim:

1. A method of avoiding visible lines between the scan lines of an image produced by line by line scanning with a beam of a monochromatic light source comprising, positioning an acousto-optic modulator in the path of the beam, driving the acousto-optic modulator with a mixture of a plurality of selected discrete individual frequencies to split the beam into a plurality of sub-beams of essentially the same intensity which together determine the width of a scan line, and modulating the intensity of the light forming the scan line.

2. A method according to claim 1, wherein said acousto-optic modulator (AOM) cell is controlled in respect of intensity by the image signal from scanning.

3. A method according to claim 1, wherein said acousto-optic modulator (AOM) cell is controlled in respect of intensity by stored picture signals.

4. A method according to claim 1, wherein said acousto-optic modulator (AOM) cell is controlled in respect of intensity by a character generator.

5. A method according to claim 1, wherein said monochromatic light source is a modulatable laser.

6. A method according to claim 1, wherein an additional modulator is used to modulate the intensity of the beam.

7. A method according to claim 1, wherein the modulation of beam intensity is performed by said acousto-optic modulator (AOM) cell.

8. A method according to claim 1 wherein said driving of the acousto-optic modulator comprises driving said modulator at selected frequencies of selected amplitudes to split the beam from the light source into a plurality of overlapping beams, to produce a scan line of uniform intensity distribution.

9. Apparatus for line scanning on a reproducing surface to produce an image comprising,
   a monocromatic light source for emitting a light beam,
   an acousto-optic modulator in the path of the beam from said light source,
   a reproduction medium which is scanned to produce an image;
   means for generating a plurality of selected discrete individual frequencies;
   means for splitting said beam from said light source into a plurality of sub-beams of essentially the same intensity which together determine the width of a scan line of the image, said means comprising
   an acousto-optic modulator cell in the path of the beam from said light source,
   means for generating a plurality of selected individual high frequencies, and
   means connecting said generating means to said acousto-optic modulator.

* * * * *